(12) United States Patent
Tsuji et al.

(10) Patent No.: US 6,649,708 B2
(45) Date of Patent: Nov. 18, 2003

(54) PROCESS FOR PRODUCING POLYMER PARTICLES

(75) Inventors: Makoto Tsuji, Wakayama (JP); Yasushi Sasaki, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/015,628

(22) Filed: Dec. 17, 2001

(65) Prior Publication Data

US 2002/0132940 A1 Sep. 19, 2002

(51) Int. Cl.[7] .................................................. C08F 2/08
(52) U.S. Cl. ........................... 526/79; 526/87; 526/194; 526/211; 526/214; 526/224; 526/321; 526/323.2; 526/329.1; 526/329.2; 526/336; 525/242; 525/309; 524/849; 524/853; 524/854
(58) Field of Search .............................. 526/79, 86, 87, 526/336, 194, 211, 214, 224, 321, 323.2, 324, 329.1, 329.2; 525/242, 309; 524/849, 853, 854

(56) References Cited

U.S. PATENT DOCUMENTS 3,792,029 A * 2/1974 Roubinek et al. ......... 526/87 X
5,412,048 A   5/1995 Longley et al.

FOREIGN PATENT DOCUMENTS

JP          7-149807          6/1995

* cited by examiner

Primary Examiner—Fred Teskin
(74) Attorney, Agent, or Firm—Oblon, Spivak, McClelland, Maier & Neustadt, P.C.

(57) ABSTRACT

To provide a process for producing polymer particles which are spherical and have smooth surfaces and small contents of oil- and the solvent-soluble at the time of being compounded. Polymer particles are produced by adding 0.099 to 47 parts by mass of a crosslinking vinyl monomer to 100 parts by mass of a vinyl monomer (referred to hereinafter as the monomer) during polymerization reaction at a degree of monomer polymerization of 1 to 100% in order to polymerize the monomer in a solvent in the presence of a dispersant and a polymerization initiator to give polymer particles.

19 Claims, No Drawings

PROCESS FOR PRODUCING POLYMER PARTICLES

TECHNICAL FIELD OF INVENTION

The present invention relates to a process for producing polymer particles used in cosmetics, information materials, coatings, lubricants etc.

PRIOR ARTS

A method of producing polymer particles by polymerizing polymers in a solvent in which their monomers are dissolved but the formed polymers are not dissolved in the presence of a dispersant for dispersing the formed polymers is called dispersion polymerization and characterized in that polymer particles having a narrow distribution of particle sizes are obtained at higher concentration in a relatively short time.

Some methods of dispersion polymerization using a crosslinking agent have been reported, and in general, if the amount of a crosslinking agent is increased, there occur aggregation of particles and deformation of particle surfaces, while if the amount is decreased, the amount of solvent-soluble contents in particles is increased without forming crosslinkage. JP-A 7-149807 discloses a method of producing spherical monodisperse polymer particles by using a specific dispersion-polymerization solvent (isoalkanol solvent) while adding a crosslinking agent under time regulation and monitoring. In other solvents, however, aggregation of particles and deformation of particle surfaces occur thus making it difficult to produce spherical polymer particles having smooth surfaces.

SUMMARY OF INVENTION

The object of the present invention is to provide a process for producing polymer particles in a solvent, which are spherical with smooth surfaces and have small amounts of oil- and/or solvent-soluble contents in a product.

The present invention provides a process for producing polymer particles, which comprises adding 0.099 to 47 parts by mass (referred to hereinafter as the amount of a polymerization crosslinking agent) of a crosslinking vinyl monomer (referred to hereinafter as the crosslinking agent) to 100 parts by mass of a vinyl monomer (referred to hereinafter as the monomer) during polymerization reaction at a degree of monomer polymerization (monomer polymerization degree) of 1 to 100% in order to polymerize the monomer in a solvent in the presence of a dispersant and a polymerization initiator to produce polymer particles.

In other words, the invention provides a process for producing polymer particles, which comprises polymerizing a vinyl monomer in a solvent in the presence of a dispersant and a polymerization initiator by adding 0.099 to 47 parts by mass of a crosslinking vinyl monomer to 100 parts by mass of the vinyl monomer to the polymerization reaction mixture at any point where the monomer polymerization degree is 1 to 100%.

A preferable-embodiment of the invention comprises adding 1 to 10% by mass of the amount of the polymerization crosslinking agent when the monomer polymerization degree is 1 to X %, X being $1 < X \leq 97$, adding 10 to 45% by mass of the amount of the polymerization crosslinking agent when the monomer polymerization degree is between X to Y %, Y being $30 \leq Y \leq 98$, and adding 45 to 89% by mass of the amount of the polymerization crosslinking agent when the monomer polymerization degree is between Y to Z %, Z being $50 \leq Z \leq 100$, provided that $X < Y < Z$.

DETAILED DESCRIPTION OF INVENTION

Monomer

The monomer used preferably in the present invention is a usual radical-polymerizable vinyl monomer (including its α-substituted monomer). Examples of the monomer include styrene, $C_{1-22}$ alkyl (meth)acrylate ("alkyl (meth)acrylate" refers to alkyl acrylate or alkyl methacrylate, and the term "(meth)" used hereinafter has the same meaning), (meth)acrylonitrile, acrylamide, vinyl acetate, vinyl pyrrolidone etc., and these monomers are used singly or in combination thereof for (co)polymerization.

For regulating the surface properties of the formed particles or for conferring reactivity on the particles, α,β-unsaturated carboxylic acids such as (meth)acrylic acid, maleic acid and itaconic acid and monomers such as maleic anhydride, chloromethyl styrene, glycidyl (meth)acrylate, (meth)acryloyloxyethyl isocyanate, 3-(trimethoxysilyl)propyl(meth)acrylate, dimethylaminoethyl (meth) acrylate, hydroxyethyl (meth)acrylate, vinyl pyridine, dimethylaminoethyl(meth)acrylate and dimethylaminopropyl (meth) acrylamide can also be polymerized or copolymerized.

The monomer concentration in the present invention is preferably 1 to 50% by mass, more preferably 2 to 30% by mass, in order to prevent problems such as delay in polymerization, destabilization of the dispersion, broader distribution of particle diameters, uncontrollable vigorous polymerization reaction, etc. The monomer concentration acts also as a factor for changing particle diameters, and generally the particle diameters tend to increase as the monomer concentration is increased.

The monomer is used by previously mixing the whole or a part of the monomer with other components, and for example when a dispersion is to be obtained at high concentration, polymerization can be carried out by feeding the monomer continuously to the reaction system. Usually, the monomer is a good solvent for the polymer formed, so the polymer is often aggregated if the monomer is fed as such without being diluted. In such a case, the monomer is diluted with a solvent before it is fed. In a special embodiment, dispersion polymerization is conducted under solvent reflux so that the monomer can be diluted with the resultant condensate before it is fed.

The concentration of the monomer fed is preferably 50% by mass or less, more preferably 30% by mass or less. To obtain polymer particles having a narrow distribution of particle sizes, the monomer concentration is desirably regulated so as not to significantly change in the reaction system where the monomer concentration is 30% by mass or less, preferably 20% by mass or less. In usual dispersion polymerization, the rate of polymerization is increased in proportion to the weight of the polymer particles previously formed, so it is preferable that the monomer is fed relatively slowly at an initial stage and fed more rapidly in the latter half of the reaction.

Polymerization Initiator

The polymerization initiator used preferably in the present invention includes e.g. peroxide type initiators such as lauroyl peroxide, benzoyl peroxide, t-butyl peroxypivalate and diisopropyl peroxy dicarbonate and azo type initiators such as azobis(isobutyronitrile), azobis(2,4-dimethylvaleronitrile), azobis(dimethylisobutyrate) and azobis(cyclohexanecarbonitrile).

It is known that in dispersion polymerization, the peroxide type initiator generally improves the stability of the dispersion by allowing a graft polymer to be formed by the action of withdrawing hydrogen from the dispersant.

However, even if an azo type initiator is used, the dispersion can be stably maintained by conducting dispersion polymerization in a hydrocarbon and/or silicon solvent with a polysiloxane compound as the dispersant.

The amount of the polymerization initiator used is preferably 0.03 to 3 mole-%, more preferably 0.1 to 1 mole-% relative to the monomer.

The polymerization initiator is used after being previously mixed with and dissolved in other components. For the purpose of reducing the residue of the monomer, the polymerization initiator can be added collectively or continuously during of the polymerization reaction, after being diluted in a solvent or so on.

Solvent

The solvent used in the present invention is not particularly limited insofar as it dissolves the dispersant and monomer but does not dissolve the formed polymer, but the solvent is preferably a non-aqueous solvent. The solvent is more preferably a hydrocarbon or silicone solvent or a mixture thereof. The hydrocarbon solvent includes e.g. aliphatic hydrocarbons such as hexane, heptane, dodecane, cyclohexane, methyl cyclohexane, isooctane and hydrogenated triisobutylene, aromatic hydrocarbons such as benzene, toluene, xylene and ethyl benzene, and the silicone solvent includes e.g. octamethyl cyclotetrasiloxane, decamethyl cyclopentasiloxane, hexamethyl disiloxane, octamethyl trisiloxane etc. Among these, hexane is particularly preferable.

The type of the solvent is an important factor influencing on the size of the formed particles and the stability of the dispersion. Generally speaking, larger particles tend to be formed as the solvent has higher affinity for the formed polymer.

Dispersant

The dispersant used in the present invention is preferably a polysiloxane compound having a radical-polymerizable group at one terminal thereof, and the polysiloxane compound having a radical-polymerizable group at one terminal thereof includes compounds represented by the general formula (I):

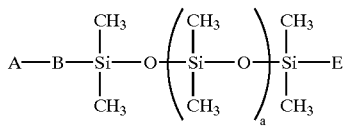

(I)

wherein:

A represents $CH_2=C(R^1)COO-$, $CH_2=C(R^1)CONR^2-$ or $CH_2=CH-C_6H_4-$ provided that $R^1$ is H or $CH_3$, R2 is H or $C_YH_{2y+1}$ whereupon Y is an integer of 1 to 4;

B represents $-(CH_2O)_m-C_nH_{2n}-$ whereupon m is 0 or 1, and n is an integer of 1 to 10;

E represents $C_pH_{2p+1}$ whereupon p is a number of 1 to 4; and a is a number of 3 to 1500.

Among these, the polysiloxane represented by the general formula (II) is particularly preferable for achieving the object of the present invention.

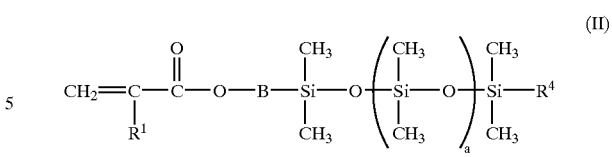

(II)

wherein $R^1$, B and a have the same meanings as defined above, and $R^4$ represents a $C_{1-4}$ alkyl group.

The polysiloxane compound having a radical-polymerizable group at one terminal thereof (referred to hereinafter as the polysiloxane compound) can be synthesized by a method utilizing chain transfer by radical polymerization, a method by anion living polymerization, etc.

The number average molecular weight (Mn) of the polysiloxane compound having a radical-polymerizable group at one terminal thereof used in the present invention is preferably 500 to 100,000, more preferably 1,000 to 50,000, from the viewpoint of a good dispersion stability of the formed polymer particles and an easy operativeness at the time of production of the polymer particles.

The amount of the dispersant used in the present invention is suitably selected depending on the stability of the system and the properties (particle diameter, surface properties etc.) necessary for the formed particles, and is preferably 0.1 to 20% by mass relative to the monomer, for a good dispersion stability and from an economical viewpoint.

Crosslinking Agent and the Method of Adding the Same

The crosslinking vinyl monomer used in the present invention including α-substitued one, includes bifunctional crosslinking agents, for example divinyl type such as divinyl benzene and di(meth)acrylate type such as ethylene glycol di(meth) acrylate and polyethylene glycol di (meth) acrylate and then multifunctional crosslinking agents such as trimethylol propane tri(meth)acrylate and tetramethylol methane tetra(meth)acrylate. Preferable crosslinking agents among these are divinyl benzene and ethylene glycol di(meth) acrylate.

When dispersion polymerization is initiated in a solvent in the presence of a monomer, a crosslinking agent, a dispersant and a polymerization initiator, cores are precipitated, and then the monomer and the crosslinking agent are distributed from the solvent onto the cores, and as polymerization advances, polymer particles are formed. When the crosslinking agent is in excess relative to the monomer at the start of the polymerization, there occur aggregation of polymer particles and deformation of particle surfaces. It is estimated that uneven monomer absorption into cores and coalescence of cores at the start of the polymerization are involved in this aggregation and deformation of particle surfaces. Further, the cores and polymer particles are very instable until the degree of polymerization reaches 1% after the polymerization is started, and thus addition of the crosslinking agent is not preferable at such stage.

In the present invention, therefore, 0.099 to 47 parts by mass of a crosslinking agent (referred to hereinafter as the amount of the polymerization crosslinking agent) is added to 100 parts by mass of a monomer during polymerization reaction at a degree of monomer polymerization of 1 to 100%, whereby dispersion-polymerization of polymer particles, without deformation and aggregation thereof and with small amounts of oil- and/or solvent-soluble contents in a product, can be effected. Preferably, 0.99 to 9 parts by mass of the crosslinking agent (referred to hereinafter as the preferable amount of the polymerization crosslinking agent)

is added to 100 parts by mass of the monomer during polymerization reaction at a degree of monomer polymerization of 1 to 100%.

The process of the present invention is more preferably a multi-stage addition production process (1) wherein while the degree of polymerization of the monomer is between 1 to x % (1<X≦97), 1 to 10% by mass of the amount of the polymerization crosslinking agent is added, while the degree of polymerization of the monomer is between X to Y % (30≦Y ≦98), 10 to 45% by mass of the amount of the polymerization crosslinking agent is added, and while the degree of polymerization of the monomer is between Y to Z % (50≦Z≦100), 45 to 89% by mass of the amount of the polymerization crosslinking agent is added (provided that X<Y<Z).

In the process of the present invention is particularly preferable a multi-stage addition production process (2) wherein, while the degree of polymerization of the monomer is between 2 to X % (2<X≦96), 2 to 6% by mass of the amount of the polymerization crosslinking agent is added, while the degree of polymerization of the monomer is between X to Y % (40≦Y≦97), 15 to 35% by mass of the amount of the polymerization crosslinking agent is added, and while the degree of polymerization of the monomer is between Y to Z % (65≦Z≦100), 60 to 83% by mass of the amount of the polymerization crosslinking agent is added (provided that X <Y<Z).

In the above multi-stage addition production processes (1) and (2), the amount of the polymerization crosslinking agent may be the preferable amount of the polymerization crosslinking agent.

According to the multi-stage addition production process in which the amount of crosslinking agent is added at a lower concentration at an initial stage of the polymerization, then the amount thereof is changed stepwise, and the amount of crosslinking agent is added at a higher concentration in the latter half of the polymerization, whereby polymer particles can be stably produced while deformation and aggregation thereof are prevented more effectively.

The degree of polymerization of the monomer can be determined by equation (III).

The degree of polymerization (%)=(amount of the monomer converted into the polymer)×100/(amount of the total monomer) (III)

The amount of the monomer converted into the polymer is determined from equation (IV) where the amount of the unreacted monomer (that is, the monomer still not fed+the monomer remaining in the reaction system) is subtracted from the amount of the total monomer. In equation (IV), the amount of "the monomer remaining in the reaction system" can be quantified by liquid chromatography or gas chromatography. Alternatively, the amount of the monomer converted into the polymer can also be approximately determined from equation (V) by measuring the amount of residues remaining after a sampled reaction solution is evaporated (treatment at 100° C. for 1 hour), but equation (IV) is preferably used.

The amount of the monomer converted into the polymer=(amount of the total monomer–amount of the unreacted monomer) (IV)

The amount of the monomer converted into the polymer=[(amount of residues after evaporation of a sampled solution–theoretical total amount of the dispersant, the crosslinking agent, the polymerization initiator and the chain transfer agent in the sampled solution)]×(amount of the reaction solution of the reactor)/(amount of the sampled solution) (V)

For achieving crosslinking as uniformly as possible, the crosslinking agent, after the degree of polymerization of the monomer reaches 1% or more, is added continuously or in equally divided portions. For this addition, the solvent is preferably diluted with a solvent. In the case where the dispersion polymerization is conducted under solvent reflux, the crosslinking agent diluted with the resultant condensate can be added.

If the amount of the crosslinking agent is too low when the polymerization is started, polymer cores are solubilized with oil and/or a solvent in a product. Hence, it is preferable that when the degree of polymerization of the monomer is 0%, 0.001 to 3 parts by mass, preferably 0.01 to 1 part by mass of the crosslinking agent relative to 100 parts by mass of the monomer has been mixed with other components containing the monomer, whereby aggregation of polymer particles and deformation of particle surfaces hardly occur, and the amount of the cores solubilized with oil or a solvent becomes low.

To conduct a sufficient crosslinking, to reduce solvent-soluble contents in the polymer particles or to prevent deformation or aggregation of the particles, the total amount of the crosslinking agent is preferably 0.1 to 50 parts by mass, more preferably 1 to 10 parts by mass relative to 100 parts by mass of the monomer.

Chain Transfer Agent

In the present invention, a chain transfer agent may be used for the purpose of regulating the molecular weight or particle size. Examples of such a chain transfer agent include mercaptans such as butyl mercaptan, mercaptoethanol, thioglycolic acid, dodecane thiol and mercapto-modified silicone, as well as carbon tetrachloride, carbon tetrabromide, dimethyl aniline, cumene, α-methylstyrene dimer etc.

Other Reaction Conditions

In this invention, the polymerization temperature is selected depending on the rate of decomposition of the polymerization initiator and the affinity of the monomer for the solvent, etc., and the polymerization temperature is preferably room temperature to 150° C., more preferably 50 to 120° C. It is convenient for the reaction to be conducted under solvent reflux in order to facilitate temperature regulation and removal of polymerization heat. The polymerization time, though being suitably selected depending on the half-life of the polymerization initiator and the reactivity of the monomer, is preferably 2 to 48 hours.

In dispersion polymerization, there is the case where residual oxygen and a polymerization inhibitor contained in the monomer can significantly change the diameters of the formed particles, thus making regulation of such polymerization-inhibiting (delaying) factors more desirable than in usual radical polymerization.

Too rapid or slow stirring causes the dispersion to be instable, so stirring is conducted preferably such that the whole system is mixed without undergoing strong shear.

Other Additives

For the purpose of producing functional particles in the process of the present invention, various additives can be coexistent in such a range that the dispersion polymerization is not adversely affected. Examples of such additives include plasticizers, dyes, a UV absorber such as a metal oxide, antimicrobial agents, perfumes etc.

The polymer particle dispersion obtained in the process of the present invention can be used as it is or after the solvent is replaced by another solvent. Using known techniques such as solid-liquid separation by centrifugation, filtration etc. or drying etc., the dispersion can be converted into particles.

The polymer particles are spherical and smooth on the surfaces. They are preferably useful in cosmetics because of a smooth feeling in touch. A preferable average size of the polymer particles is 0.1 to 40 micronmeters, more preferably 0.3 to 10 micronmeters from the view point of prevention of squeaking and roughness in touch. The average size can be determined as the weight-average in a dispersion thereof in an alcohol or a hydrocarbon such as hexane at the room temperature, at 20° C., with a laser diffraction size distribution determining device, for example LA-910 of Horiba Company.

In the polymer particles, there are only small amounts of oil- and/or solvent-soluble contents and thus they are stable against a solvent and oil of cosmetics etc. The shelf stability thereof in the form of a compounded product is also good.

EXAMPLE

Example 1

A four-necked flask was charged at room temperature with 1980 g n-hexane, 50 g polysiloxane modified at one terminal thereof with methacryloyl (Silaplane FM-0725 with an average molecular weight of 10,000 as a dispersant, manufactured by Chisso Corporation), 750 g (7.49 mol) methyl methacrylate, 250 g (2.40 mol) styrene and 25 g (0.063 mol) lauroyl peroxide, and the mixture was stirred for about 1 hour during which the atmosphere was replaced by nitrogen. The four-necked flask was immersed in an oil bath at 30° C., in which the temperature was regulated such that the solvent was refluxed at 30° C. or more for about 2 hours. After about 1 hour, the system began to become turbid and initiation of the polymerization was confirmed (degree of polymerization, 0.9%).

One hour (degree of polymerization, 2.4%) after the polymerization was initiated, the dropwise addition of a solution of 0.7 g divinyl benzene (0.07% by mass relative to the monomer, or 2.3% by mass of the amount of the polymerization crosslinking agent) in 75 g n-hexane was initiated, and after 2.3 hours (degree of polymerization, 70%), the addition was finished. Subsequently, the dropwise addition of a solution of 7.5 g divinyl benzene (0.75% by mass relative to the monomer, or 24.4% by mass of the amount of the polymerization crosslinking agent) in 22 g n-hexane was initiated, and after 1 hour (degree of polymerization, 88%), the quantitative feed was finished. Subsequently, the dropwise addition of a solution of 22.5 g divinyl benzene (2.25% by mass relative to the monomer, or 73.3% by mass of the amount of the polymerization crosslinking agent) in 44 g n-hexane was initiated, and after 1.5 hours (degree of polymerization, 95%), the quantitative feed was finished.

Eighteen hours after the polymerization was initiated, the reaction was stopped to give slurry.

Example 2

A four-necked flask was charged at room temperature with 566 g n-hexane, 9.6 g polysiloxane modified at one terminal thereof with methacryloyl (Silaplane FM-0725 with a number average molecular weight of 10,000 as a dispersant, manufactured by Chisso Corporation), 180 g methyl methacrylate, 60 g styrene, 0.05 g divinyl benzene and 6.0 g lauroyl peroxide, and the mixture was stirred for about 30 minutes during which the atmosphere was replaced by nitrogen. The four-necked flask was immersed in an oil bath at 25° C., in which the temperature was regulated such that the solvent was refluxed at 25° C. or more for about 3 hours. After about 1 hour, the system began to become turbid and initiation of the polymerization was confirmed (degree of polymerization, 0.9%).

Half hour (degree of polymerization, 1%) after the polymerization was initiated, the dropwise addition of a solution of 0.17 g divinyl benzene (0.07% by mass relative to the monomer, or 2.4% by mass of the amount of the polymerization crosslinking agent) in 12.5 g n-hexane was initiated. Three hours (degree of polymerization, 54%) after the polymerization was initiated, the addition was finished. Subsequently, the dropwise addition of a solution of 1.80 g divinyl benzene (0.75% by mass relative to the monomer, or 25.0% by mass of the amount of the polymerization crossking agent) in 6.5 g n-hexane was initiated, and 4 hours (degree of polymerization, 79%) after the polymerization was initiated, the addition was finished. Subsequently, the dropwise addition of a solution of 5.22 g divinyl benzene (2.18% by mass relative to the monomer, or 72.6% by mass of the amount of the polymerization crosslinking agent) in 18.5 g n-hexane was initiated, and 5.5 hours (degree of polymerization, 89%) after the polymerization was initiated, the addition was finished.

Eighteen hours after the polymerization was initiated, the reaction was stopped to give slurry.

Example 3

A four-necked flask was charged at room temperature with 566 g n-hexane, 9.6 g polysiloxane modified at one terminal thereof with methacryloyl (Silaplane FM-0725 with a number average molecular weight of 10,000 as a dispersant, manufactured by Chisso Corporation), 180 g methyl methacrylate, 60 g styrene, 0.05 g divinyl benzene and 6.0 g lauroyl peroxide, and the mixture was stirred for about 30 minutes during which the atmosphere was replaced by nitrogen. The four-necked flask was immersed in an oil bath at 25° C., in which the temperature was regulated such that the solvent was refluxed at 25° C. or more for about 3 hours. After about 1 hour, the system began to become turbid and initiation of the polymerization was confirmed (degree of polymerization, 0.5%).

Two and half hours (degree of polymerization, 30%) after the polymerization was initiated, the dropwise addition of a solution of 0.17 g divinyl benzene (0.07% by mass relative to the monomer, or 2.4% by mass of the amount of the polymerization crosslinking agent) in 12.5 g n-hexane was initiated. Five hours (degree of polymerization, 93%) after the polymerization was initiated, the addition was finished. Subsequently, the dropwise addition of a solution of 1.80 g divinyl benzene (0.75% by mass relative to the monomer, or 25.0% by mass of the amount of the polymerization crosslinking agent) in 6.5 g n-hexane was initiated, and 6 hours (degree of polymerization, 97%) after the polymerization was initiated, the addition was finished. Subsequently, the dropwise addition of a solution of 5.22 g divinyl benzene (2.18% by mass relative to the monomer, or 72.6% by mass of the amount of the polymerization crosslinking agent) in 18.5 g n-hexane was initiated, and 7.5 hours (degree of polymerization, 98%), after the polymerization was initiated, the addition was finished.

Eighteen hours after the polymerization was initiated, the reaction was stopped to give slurry.

Example 4

A four-necked flask was charged at room temperature with 2333 g n-hexane, 40 g polysiloxane modified at one terminal thereof with methacryloyl (Silaplane FM-0725 with a number average molecular weight of 10,000 as a dispersant, manufactured by Chisso Corporation), 750 g methyl methacrylate, 250 g styrene, 0.2 g divinyl benzene and 20 g lauroyl peroxide, and the mixture was stirred for about 30 minutes during which the atmosphere was replaced by nitrogen. The four-necked flask was immersed in an oil bath. After about 1 hour, the system began to become turbid and initiation of the polymerization was confirmed (degree of polymerization, 0.5%).

Half hour (degree of polymerization, 1%) after the polymerization was initiated, the dropwise addition of a solution of 0.375 g divinyl benzene (0.038% by mass relative to the monomer, or 1.2% by mass of the amount of the polymerization crosslinking agent) in 45 g n-hexane was initiated. Two hours (degree of polymerization, 14%) after the polymerization was initiated, the addition was finished. Subsequently, the dropwise addition of a solution of 0.75 g divinyl benzene (0.075% by mass relative to the monomer, or 2.5% by mass of the amount of the polymerization crosslinking agent) in 30 g n-hexane was initiated, and 3 hours (degree of polymerization, 49%) after the polymerization was initiated, the addition was finished. Subsequently, the dropwise addition of a solution of 7.5 g divinyl benzene (0.75% by mass relative to the monomer, or 24.7% by mass of the amount of the polymerization crosslinking agent) in 30 g n-hexane was initiated, and after 4 hours (degree of polymerization, 76%), the addition was finished. Subsequently, the dropwise addition of a solution of 21.75 g divinyl benzene (2.18% by mass relative to the monomer, or 71.6% by mass of the amount of the polymerization crosslinking agent) in 45 g n-hexane was initiated, and 5.5 hours (degree of polymerization, 85%) after the polymerization was initiated, the addition was finished.

Twenty-four hours after the polymerization was initiated, the reaction was stopped to give slurry.

Example 5

A four-necked flask was charged at room temperature with 233 g n-hexane, 4 g polysiloxane modified at one terminal thereof with methacryloyl (Silaplane FM-0725 with a number average molecular weight of 10,000 as a dispersant, manufactured by Chisso Corporation), 75 g methyl methacrylate, 25 g styrene and 2 g lauroyl peroxide, and the mixture was stirred for about 30 minutes during which the atmosphere was replaced by nitrogen. The four-necked flask was immersed in an oil bath. After about 1 hour, the system began to become turbid and initiation of the polymerization was confirmed (degree of polymerization, 0.6%).

Half hour (degree of polymerization, 2%) after the polymerization was initiated, the dropwise addition of a solution of 0.01 g divinyl benzene (0.01% by mass relative to the monomer, or 1.3% by mass of the amount of the polymerization crosslinking agent) in 6 mL n-hexane was initiated. One and half hours (degree of polymerization, 13%) after the polymerization was initiated, the addition was finished. Subsequently, the dropwise addition of a solution of 0.02 g divinyl benzene (0.02% by mass relative to the monomer, or 2.5% by mass of the amount of the polymerization crosslinking agent) in 3 mL n-hexane was initiated, and 2 hours (degree of polymerization, 19%) after the polymerization was initiated, the addition was finished. Subsequently, the dropwise addition of a solution of 0.025 g divinyl benzene (0.025% by mass relative to the monomer, or 3.2% by mass of the amount of the polymerization crosslinking agent) in 3 mL n-hexane was initiated, and 2.5 hours (degree of polymerization, 34%) after the polymerization was initiated, the addition was finished. Subsequently, the dropwise addition of a solution of 0.03 g divinyl benzene (0.03% by mass relative to the monomer, or 3.8% by mass of the amount of the polymerization crosslinking agent) in 3 mL g n-hexane was initiated, and 3 hours (degree of polymerization, 45%) after the polymerization was initiated, the addition was finished. Subsequently, the dropwise addition of a solution of 0.3 g divinyl benzene (0.3% by mass relative to the monomer, or 79% by mass of the amount of the polymerization crosslinking agent) in 6 mL g n-hexane was initiated, and 4 hours (degree of polymerization, 79%) after the polymerization was initiated, the addition was finished. Subsequently, the dropwise addition of a solution of 0.4 g divinyl benzene (0.4% by mass relative to the monomer, or 51% by mass of the amount of the polymerization crosslinking agent) in 9 mL g n-hexane was initiated, and 5.5 hours (degree of polymerization, 90%) after the polymerization was initiated, the addition was finished.

Eighteen hours after the polymerization was initiated, the reaction was stopped to give slurry.

Comparative Example 1

A four-necked flask was charged at room temperature with 560 g n-hexane, 4.8 g of the same polysiloxane modified at one terminal thereof with methacryloyl as in Example 1, 120 g (1.2 mol) methyl methacrylate, 40 g (0.38 mol) styrene, 1.6 g divinyl benzene (1% by mass relative to the monomer) and 3.2 g (0.008 mol) lauroyl peroxide, and the mixture was stirred for about 1 hour during which the atmosphere was replaced by nitrogen. The four-necked flask was immersed in an oil bath at 25° C., in which the temperature was regulated such that the solvent was refluxed at 25° C. or more for about 2 hours. After about 1 hour, the system began to become turbid and initiation of the polymerization was confirmed (degree of polymerization, 0.8%). Eighteen hours after the polymerization was initiated, the reaction was stopped to give slurry.

Comparative Example 2

A four-necked flask was charged at room temperature with 560 g n-hexane, 4.8 g of the same polysiloxane modified at one terminal thereof with methacryloyl as in Example 1, 120 g (1.2 mol) methyl methacrylate, 40 g (0.38 mol) styrene, 8.0 g divinyl benzene (5% by mass relative to the monomer) and 3.2 g (0.008 mol) lauroyl peroxide, and the mixture was stirred for about 1 hour during which the atmosphere was replaced by nitrogen. The four-necked flask was immersed in an oil bath at 25° C., in which the temperature was regulated such that the solvent was refluxed at 25° C. or more for about 2 hours. After about 1 hour, the system began to become turbid and initiation of the polymerization was confirmed (degree of polymerization, 0.7%). One hour after the polymerization was initiated, aggregates were formed in the system, and thus the reaction was stopped. (Note: The purity of divinyl benzene in the Examples and Comparative Examples is 81%. The weight % of divinyl benzene relative to the monomer is expressed assuming that the purity thereof is 100%.)

The slurries obtained in Examples 1 to 5 and Comparative Example 1 were evaluated for their particles in the following method. The results are shown in Table 1.

Method of Evaluating the Particles
(1) Particle form (observed under SEM): The slurry was diluted and washed with n-hexane, and the resulting particles were observed under FE-SEM (model S-4000) produced by Hitachi, Ltd.
(2) Solvent-soluble content: From 3 g slurry, the solvent was distilled away, and the slurry solid was accurately weighed (Ag). 50-fold excess amount of acetone was added to the slurry solid and sonicated for 30 minutes (Ultrasonic Washer US-4, produced by AS ONE COOPERATION). Thereafter, the sample was centrifuged and the whole supernatant was taken. The acetone in the supernatant was evaporated, and the precipitated solid was accurately weighed (B g), and the solvent-soluble content was determined according to the following equation:

Solvent-soluble content (%)=$B \times 100/A$

TABLE 1

| | Particle form | Solvent - soluble content (%) | Remark |
|---|---|---|---|
| Example 1 | Spherical with smooth surface | 15 | Not aggregated |
| Example 2 | Spherical with slightly smooth surface | 14 | Not aggregated |
| Example 3 | Spherical with smooth surface | 24 | Not aggregated |
| Example 4 | Spherical with small hollows on the surface | 11 | Not aggregated |
| Example 5 | Spherical with slightly smooth surface | 24 | Not aggregated |
| Comparative Example 1 | Deformed | 25 | Not aggregated |
| Comparative Example 2 | — | — | Aggregated occurred |

As shown in Table 1, the polymer particles of the present invention were spherical with smooth surfaces, and the solvent-soluble contents of the polymer particles were lower.

What is claimed is:

1. A process for producing polymer particles, which comprises polymerizing a vinyl monomer in a solvent in the presence of a dispersant and a polymerization initiator by adding 0.099 to 47 parts by mass of a crosslinking vinyl monomer to 100 parts by mass of the vinyl monomer to the polymerization reaction mixture at any point where the monomer polymerization degree is 1 to 100%, wherein 1 to 10% by mass of the total amount of the crosslinking vinyl monomer is added when the monomer polymerization degree is between 1 to X %, and $1 < X \leq 97$, 10 to 45% by mass of the crosslinking vinyl monomer is added when the monomer polymerization degree is between X to Y %, and $30 \leq Y \leq 98$, and 45 to 89% by mass of the crosslinking vinyl monomer is added when the monomer polymerization degree is between Y to Z %, and $50 \leq Z \leq 100$, provided that $X < Y < Z$.

2. The process according to claim 1, further comprising adding 0.001 to 3 parts by mass of the crosslinking agent per 100 parts by mass of the monomer when the monomer polymerization degree is 0%.

3. The process according claim 1, wherein the dispersant is a polysiloxane compound having a radical polymerizable group at one terminal thereof.

4. The process according to claim 1, wherein the solvent is a hydrocarbon compound, a silicone compound or a mixture thereof.

5. The process according to claim 1, wherein the dispersant is a compound according to formula (I):

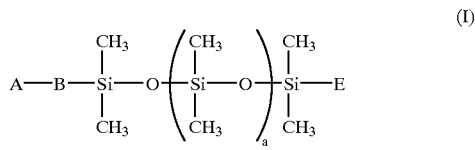

wherein:

A represents $CH_2=C(R^1)COO-$, $CH_2=C(R^1)CONR^2-$ or $CH_2=CH-C_6H_4-$ provided that $R^1$ is H or $CH_3$, $R^2$ is H or $C_YH_{2Y+1}$ whereupon Y is an integer of 1 to 4;

B represents $-(CH_2O)_m-C_nH_{2n}-$ whereupon m is 0 or 1, and n is an integer of 1 to 10;

E represents $C_pH_{2p+1}$ whereupon p is a number of 1 to 4; and a is a number of 3 to 1500.

6. The process according to claim 5, wherein the compound according to formula (I) is a compound according to formula (II):

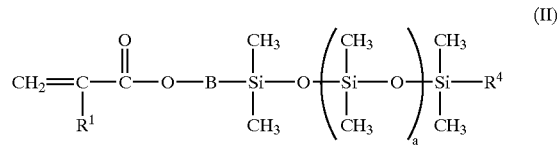

wherein $R^1$, B and a have the same meanings as defined above, and $R^4$ represents a $C_{1-4}$ alkyl group.

7. The process according to claim 1, wherein the dispersant is present in an amount of from 0.1 to 20% by weight relative to the weight of vinyl monomer.

8. The process according to claim 1, wherein the crosslinking vinyl monomer is selected from the group consisting of divinyl benzene, ethylene glycol di(meth)acrylate, trimethylol propane tri(meth)acrylate, and tetramethylol methane tetra(meth)acrylate.

9. The process according to claim 1, wherein the crosslinking vinyl monomer is added continuously or in equally divided portions.

10. The process according to claim 1, further comprising adding 0.01 to 1 parts by mass of the crosslinking agent per 100 parts by mass of the monomer when the monomer polymerization degree is 0%.

11. The process according to claim 1, further comprising adding a chain transfer agent.

12. The process according to claim 11, wherein the chain transfer agent is selected from the group consisting of butyl mercaptan, mercaptoethanol, thioglycolic acid, dodecane thiol, mercapto-modified silicon, carbon tetrachloride, carbon tetrabromide, dimethyl aniline, cumene, and α-methylstyrene dimer.

13. The process according to claim 1, wherein said polymerizing is carried out at a temperature of from room temperature to 150° C.

14. The process according to claim 1, wherein said polymerizing is carried out at a temperature of from 50 to 120° C.

15. The process according to claim 1, further comprising adding additives selected from the group consisting of a plasticizer, a dye, a UV absorber, a microbial agent, and a perfume.

16. A process for producing polymer particles, which comprises polymerizing a vinyl monomer in a solvent in the presence of a dispersant and a polymerization initiator by adding 0.099 to 47 parts by mass of a crosslinking vinyl monomer to 100 parts by mass of the vinyl monomer to the polymerization reaction mixture at any point where the monomer polymerization degree is 1 to 100%, wherein the solvent is a hydrocarbon compound, a silicone compound or a mixture thereof.

17. The process according to claim 16, further comprising adding 0.001 to 3 parts by mass of the crosslinking agent per 100 parts by mass of the monomer when the monomer polymerization degree is 0%.

18. The process according claim 16, wherein the dispersant is a polysiloxane compound having a radical polymerizable group at one terminal thereof.

19. A process for producing polymer particles, which comprises polymerizing a vinyl monomer in a solvent in the presence of a dispersant and a polymerization initiator by adding 0.099 to 47 parts by mass of a crosslinking vinyl monomer to 100 parts by mass of the vinyl monomer to the polymerization reaction mixture at any point where the monomer polymerization degree is 1 to 100%, wherein the dispersant is a polysiloxane compound having a radical polymerizable group at one terminal thereof.

* * * * *